(12) United States Patent
Simske et al.

(10) Patent No.: US 11,108,918 B2
(45) Date of Patent: Aug. 31, 2021

(54) ASSESSING PRINT QUALITY USING INTENSITY HISTOGRAMS AND PERIMETER LENGTHS

(71) Applicant: HEWLETT-PACKARD DEVELOPMENT COMPANY, L.P., Houston, TX (US)

(72) Inventors: Steven J. Simske, Fort Collins, CO (US); Karl Walters, San Diego, CA (US); Douglas A. Sexton, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 593 days.

(21) Appl. No.: 16/077,055

(22) PCT Filed: Jan. 17, 2017

(86) PCT No.: PCT/US2017/013757
§ 371 (c)(1),
(2) Date: Aug. 10, 2018

(87) PCT Pub. No.: WO2018/136037
PCT Pub. Date: Jul. 26, 2018

(65) Prior Publication Data
US 2021/0203790 A1    Jul. 1, 2021

(51) Int. Cl.
*H04N 1/00* (2006.01)
*H04N 1/60* (2006.01)

(52) U.S. Cl.
CPC ..... *H04N 1/00034* (2013.01); *H04N 1/00015* (2013.01); *H04N 1/00068* (2013.01);
(Continued)

(58) Field of Classification Search
CPC combination set(s) only.
See application file for complete search history.

(56) References Cited

U.S. PATENT DOCUMENTS 6,874,420 B2 *  4/2005  Lewis, Jr. ........... B41F 33/0081
                                                        101/181
7,524,015 B2    4/2009  Srinivasan et al.
(Continued)

FOREIGN PATENT DOCUMENTS

CN      101639450 A    2/2010
EP        0599482 A2   6/1994
JP      2013123582 A   6/2013

OTHER PUBLICATIONS

Brown et al., "Automatic Gravure Print Feature Determination at Production Speeds", Journal of Engineering Manufacture, vol. 217, Issue No. 8, Retrieved from Internet: https://dspace.lboro.ac.uk/dspace-jspui/bitstream/2134/4709/1/brown_automatic.pdf, 2003, pp. 1101-1110.

(Continued)

*Primary Examiner* — Barbara D Reinier
(74) *Attorney, Agent, or Firm* — Fabian VanCott

(57) ABSTRACT

In one example in accordance with the present disclosure, a method for assessing print quality is described. According to the method, a printed mark is converted into a digital binary mark. A number of values are calculated for the digital binary mark. The number of values include at least a perimeter length value and a value describing a characteristic of an intensity histogram for the digital binary mark. A combined representation of the number of values for the digital binary mark are compared against a combined representation of a number of values for a model printed mark. When the combined representation for the digital binary mark is greater than a predefined distance away from the combined representation for the model printed mark, an operation of a printing device that generated the printed mark is adjusted.

15 Claims, 4 Drawing Sheets

(52) U.S. Cl.
CPC ..... *H04N 1/00082* (2013.01); *H04N 1/00031* (2013.01); *H04N 1/00045* (2013.01); *H04N 1/6036* (2013.01)

(56) References Cited

U.S. PATENT DOCUMENTS

| | | |
|---|---|---|
| 7,899,256 B2 | 3/2011 | Fedorovskaya et al. |
| 8,600,154 B2 | 12/2013 | Umeda et al. |
| 2004/0012801 A1 | 1/2004 | Murakami |

OTHER PUBLICATIONS

Yankai et al., "Research on Print Quality Assessment and Identification: Evaluation of Print Edge Roughness", IEEE, Retrieved from Internet: http://ieeexplore.ieee.org/document/5364481/, 2009, 4 pages.

\* cited by examiner

ASSESSING PRINT QUALITY USING INTENSITY HISTOGRAMS AND PERIMETER LENGTHS

BACKGROUND

Printing devices such as inkjet printheads are widely used for precisely, and rapidly, dispensing small quantities of fluid, such as ink, onto media, such as paper. Such printing devices come in many forms. For example, residential printing devices provide users with a simple and economical way to produce printed text or images. As another example, large format printing devices facilitate printing on larger media, such as posters and signs that are larger than letter-sized media.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
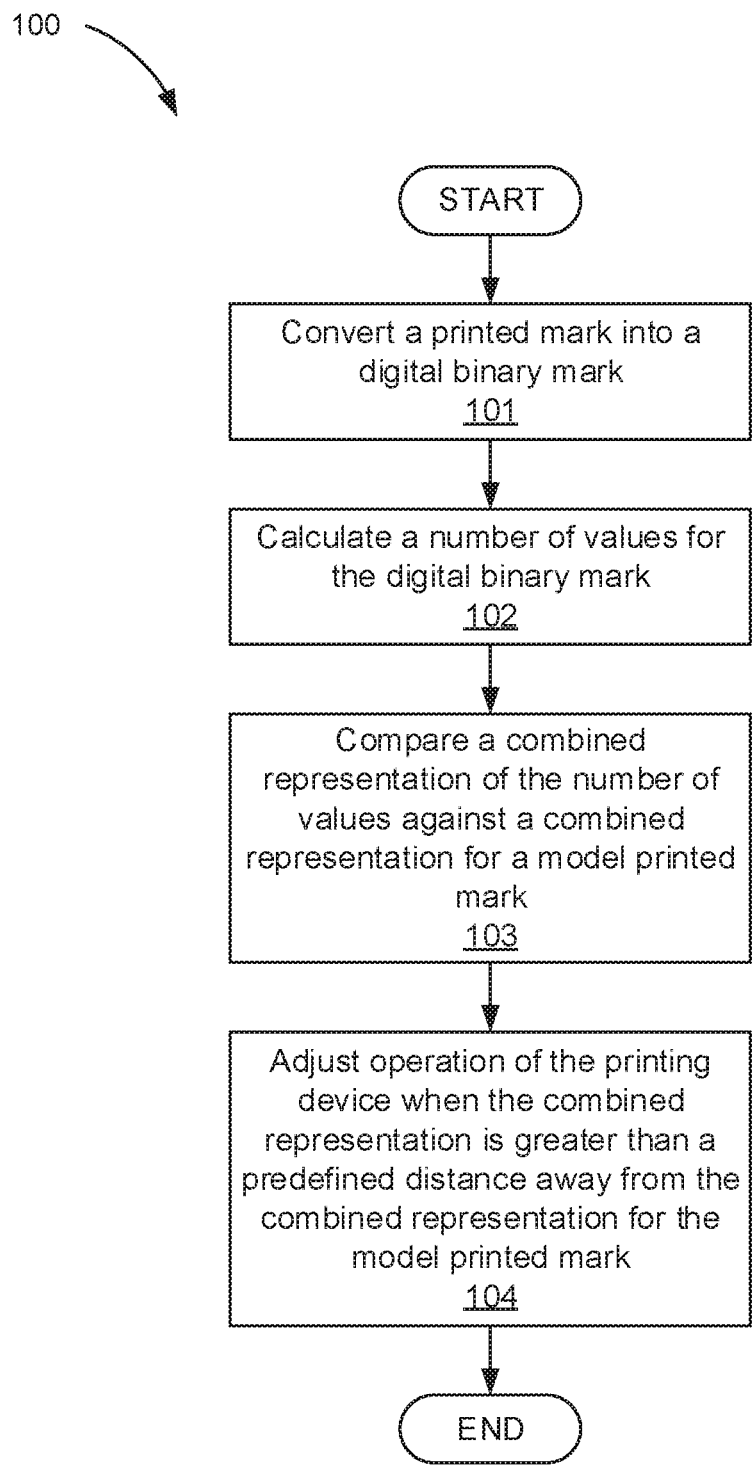
FIG. 1 is a flowchart of a method for assessing print quality using an intensity histogram and perimeter length, according to an example of the principles described herein.

Printing devices such as inkjet printheads are widely used for precisely, and rapidly, dispensing small quantities of fluid, such as ink, onto media, such as paper. Such printing devices come in many forms. For example, residential printing devices provide users with a simple and economical way to produce printed text or images. As another example, large format printing devices facilitate printing on larger media, such as posters and signs that are larger than letter-sized media.

Over time, the use of such printing devices has risen, and their use is likely to continue to rise in the future. Moreover, consumer demand for increased performance leads manufacturers to develop more technically advanced and efficient printing devices. For example, printing devices have been developed that more quickly execute print operations. That is, printing devices deliver printed products at a faster rate. However, developing printing devices that can print faster, may have unintended consequences.

For example, increasing print speed can result in a decrease in print quality. Specifically, if the media moves relative to the fluid ejection nozzles, or if the fluid ejection nozzles move relative to the media, at too quick a rate, the fluid deposition amount may be reduced as there is a limit to the rate at which drops can be formed and delivered to the media. Such a reduction in fluid deposition amount translates into lighter text and/or images formed on the media, which is less desirable. Still further, printing speeds that are too fast result in rougher text/image boundaries due to incomplete fluid coverage by the nozzles. Again, leading to lighter fluid density in dark areas of the printed mark. More specifically, increasing printing speeds results in ejected fluid drops that have greater spatial separation on the media. The rougher text/image boundaries are discernible by users as low print quality. One solution to these complications is to reduce print speed. However, this does not provide the technical advantage of faster printing speeds, may lead to inefficiencies as a printing device could be operated at a faster speed without discernibly affecting print quality, and results in a higher per-page cost reducing its competitive position in the market.

Accordingly, the present specification describes methods and systems that balance printing device operation and print quality. Specifically, the present specification describes a method wherein the print quality of a printed mark is measured against a model printed mark, in which the model printed mark has a predetermined acceptable print quality. An operation of the printing device, such as printing speed, can then be adjusted as desired to bring the print quality closer to, or equal to, the desired print quality level.

Specifically, the present specification describes a method for assessing print quality. According to the method, a printed mark is converted into a digital binary mark. A number of values for the digital binary mark are calculated, which include at least a perimeter length value and a value describing a characteristic of an intensity histogram for the printed mark. A combined representation of the number of values is compared against a combined representation of a model printed mark and an operation of the printing device that generated the printed image is adjusted when the combined representation is greater than a predetermined distance away from the combined representation of the model printed mark.

The present specification also describes a printing system. The printing system includes a printing device to form printed marks on media by depositing fluid on the media. The printing system also includes a print quality assessment device. The print quality assessment device includes a capture engine to 1) capture a digital representation of the printed mark and 2) convert the digital representation into a digital binary mark. An analysis engine of the print quality assessment device calculates a number of values for the digital binary mark and a comparing engine compares a combined representation of the number of values against a combined representation of a model printed mark. The printing system also includes a controller to adjust an operation of at least one component of the printing device when the combined representation is greater than a predetermined distance away from the combined representation of the model printed mark.

The present specification also describes a computer system that includes a processor and a machine-readable storage medium coupled to the processor. An instruction set to assess print quality is stored in the machine-readable storage medium and is to be executed by the processor. The instruction set includes instructions to convert a printed mark into a digital binary mark and instructions to calculate a number of values for the digital binary mark. The number of values include a perimeter roughness value, a perimeter length value, an intensity histogram mean value, an intensity histogram variance value, and an intensity histogram mean-to-variance ratio value. The instruction set to assess print quality also includes instructions to compare a combined representation of the number of values against a combined representation of a model printed mark and instructions to adjust operation of a printing device that generated the printed mark when the combined representation is greater than a predetermined distance away from the combined representation of the model printed mark.

In one example, using such a print quality assessment tool 1) provides for print quality assessment without previous mark identification 2) provides for print quality assessment without comparison to a test pattern; or ground truthing, but rather relies on a sample print from a distinct printing device, 3) simplifies print quality detection, 4) balances print speed with print quality, 5) optimizes print fluid usage by increasing speed without compromising user expectations on print quality, and 6) can be implemented on any printer at any speed. However, it is contemplated that the devices disclosed herein may address other matters and deficiencies in a number of technical areas.

As used in the present specification and in the appended claims, the term "printed mark" refers to a glyph, text, or image that is formed on media by depositing a print fluid in a pattern representative of the mark.

Further, as used in the present specification and in the appended claims, the term "binary mark" refers to a representation of the printed mark that has two possible values for each pixel, which values may correspond to the colors black and white.

Still further, as used in the present specification and in the appended claims, the term "intensity histogram" refers to a diagram that indicates a number of pixels in an image at various intensity values.

Even further, as used in the present specification and in the appended claims, the term "distance" is a unit-less metric indicating a difference between a unit-less measure of the combined representation for an evaluated printed mark and the unit-less measure of the combined representation for a model printed mark.

Even further, as used in the present specification and in the appended claims, the term "a number of" or similar language is meant to be understood broadly as any positive number including 1 to infinity.

Figure 3:
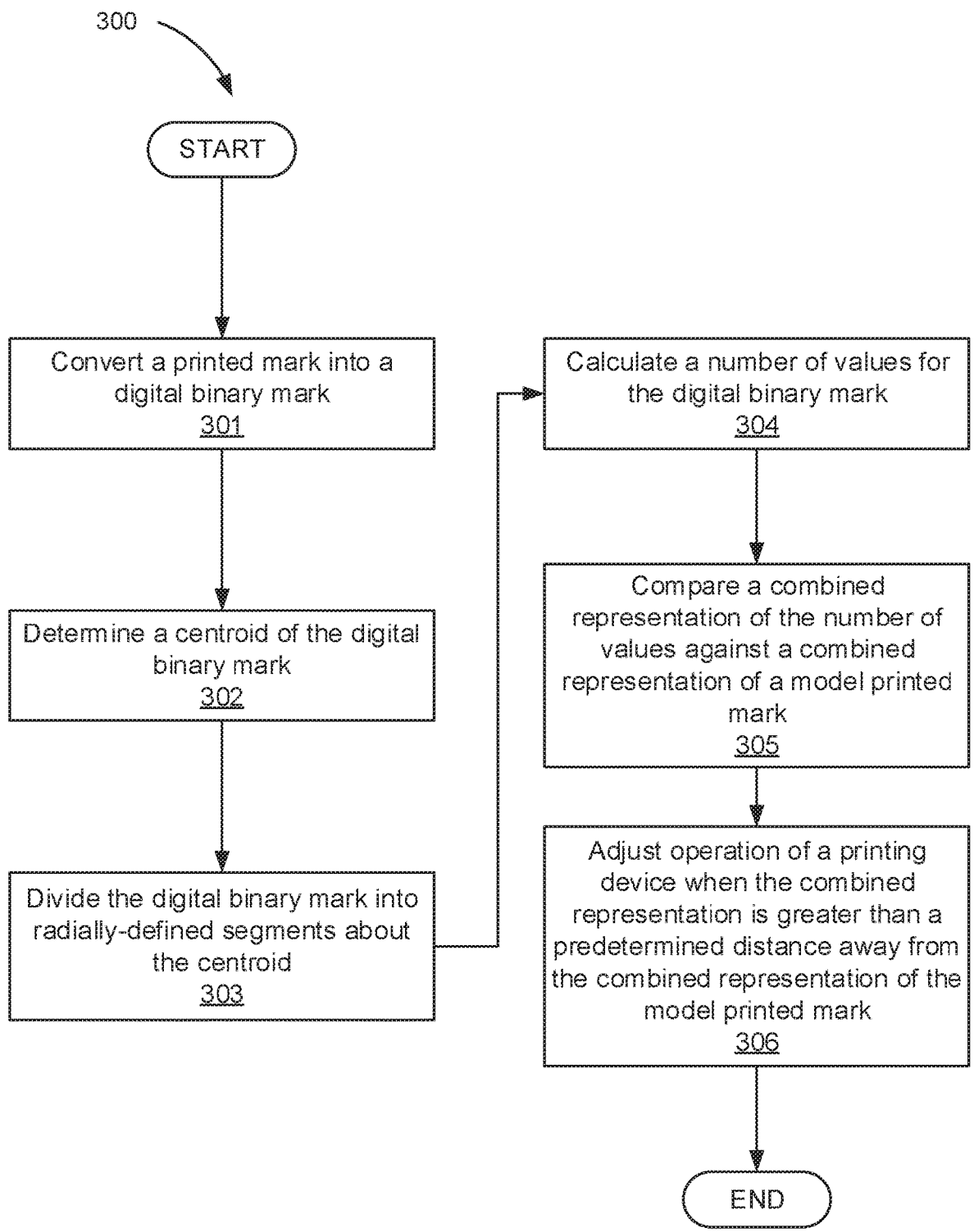
FIG. 3 is a flowchart of a method for assessing print quality using an intensity histogram and perimeter length, according to another example of the principles described herein.

FIG. 1 is a flowchart of a method (100) for assessing print quality using an intensity histogram and perimeter length, according to an example of the principles described herein. As a general note, the methods (100, 300) may be described below as being executed or performed by at least one device, for example, a computing device. Other suitable systems and/or computing devices may be used as well. The methods (100, 300) may be implemented in the form of executable instructions stored on at least one machine-readable storage medium of at least one of the devices and executed by at least one processor of at least one of the devices. In one implementation, the machine-readable storage medium may include a standalone program installed on the device. In another implementation, the machine-readable medium may include instructions delivered by a browser on the device. Alternatively, or in addition, the methods (100, 300) may be implemented in the form of electronic circuitry (e.g., hardware). While FIGS. 1 and 3 depict operations occurring in a particular order, a number of the operations of the methods (100, 300) may be executed concurrently or in a different order than shown in FIGS. 1 and 3. In some examples, the methods (100, 300) may include more or fewer operations than are shown in FIGS. 1 and 3. In some examples, a number of the operations of the methods (100, 300) may, at certain times, be ongoing and/or may repeat.

According to the method (100), a digital binary mark is converted (block 101) from a printed mark. As described above, printing devices such as ink jet printheads form printed text or images on media by depositing fluid on the media. To assess print quality, these printed "marks" can be converted into a digital binary representation. Binarization separates a mark into a set of pixels that are in the foreground and a set of pixels that are in the background. Doing so facilitates a determination of objects, i.e., text characters, glyphs, line segments, and a determination of non-objects. The digital binary mark is created by analyzing each pixel of the printed mark, and converting it to either a black pixel value or a white pixel value.

Following binarization, a three-tiered region of a digital binary mark is defined, the three tiers being a bounding box of the mark, a polygon of the mark, which defines the jagged perimeter of the mark, and a scan line segment, which refers to a print-wide length of colored pixels. The boundary box gives the x and y span of the mark, the polygon outlines the mark, and the scan line segments indicate the individual pixel locations.

With the binary mark created, a number of values can be calculated (block 102) for the digital binary mark. These values aid in determining the print quality level for a particular mark, and whether or not the print quality is satisfactory as measured against a model printed mark. In particular, a perimeter length value and values relating to the intensity histogram of the printed mark are indicative of print quality. For example, a printed mark with a shorter perimeter length has a higher print quality as compared to the same printed mark with a longer perimeter length as it has less additional boundary variations. Moreover, a printed mark with an intensity histogram mean that is lower than the same mark with a higher intensity histogram mean has higher print quality.

A perimeter length value can be calculated by analyzing the perimeter of the printed mark to determine a perimeter length, as measured in pixels. Specifically, absolute x and y pixel differences from sequential points that outline the object are summed together to form the perimeter length.

Regarding a value relating to an intensity histogram, an intensity histogram is a diagram that indicates, for different levels of intensity, a quantity of pixels at that intensity level. From this intensity histogram, any number of properties can be calculated. For example, an intensity histogram variance, an intensity histogram mean, and a ratio of the intensity histogram mean to the intensity histogram variance can be calculated. That is, a mean value of the intensity histogram can be determined, a variance across the intensity histogram can be determined, and this value presented as a value indicative of quality of the printed mark.

With these values determined, the values can be combined, and the combined representation compared (block 103) against a combined representation for a model printed mark. In some examples, the number of values can be linearly combined by a processor of a computing system, such as a processor in a print system, by simply adding the values together and/or multiplying each value by an appropriate coefficient. For example, the processor of a print system or other computing system can combine the different values per the relationship identified in Equation (1).

$$CR = (C1*pl) + (C2*pr) + (C3*mi) + (C4*vi) + (C5*rmv) \quad \text{Equation (1)}$$

In Equation (1), CR refers to the combined representation, pi refers to the perimeter length, pr refers to the perimeter roughness, mi refers to the mean intensity, vi refers to the variance of intensity, and rmv refers to the ratio of mean intensity to variance in intensity. Also, note that in Equation (1), $C1+C2+C3+C4+C5=1.0$ and the values of perimeter, perimeter roughness, mean intensity, variance in intensity, and ratio of mean/variance are normalized to have the same peak value. Accordingly, a processor of a computing system such as a print system can implement a particular relationship such as that identified in Equation (1) to combine the values into a combined representation.

The combined representation may reflect a weighting to each of the number of values. The weighting may reflect a corresponding degree of correlation between individual values of the number of values and print quality. For example, an intensity histogram mean-to-variance ratio may be more strongly correlated to discernible print quality than perimeter roughness and therefore may be weighted accordingly. While specific reference is made to a linear combination with weighting, any variation of combining the different values to generate a combined representation may be used.

As described above, this combined representation is compared (block 103) to a combined representation for a model printed mark. In some examples, the model combined representation may be determined from a printed mark having an identified and acceptable quality. The combined representation of the digital binary mark can be compared (block 103) against this model combined representation. If the combined representation of the digital binary mark is within a threshold distance of the combined representation of the model printed mark, the digital binary mark, and corresponding printed mark, may be determined to have a satisfactory print quality.

Accordingly, in some examples, comparing (block 103) a combined representation against a combined representation for a model printed mark may include consulting a lookup table. The lookup table may be divided into different levels of print quality. That is, the lookup table may correspond to different model printed marks. As an example, a user may select that a high print quality is desired, which corresponding lookup table has combined representations for a model printed mark having a high print quality. In another example, a user may select an intermediate print quality, and comparing (block 103) the combined representation against a combined representation for a model printed mark includes consulting a lookup table with combined representations that correlate to an intermediate print quality model printed mark.

If print quality is not satisfactory, i.e., if the combined representation of the number of values of the digital binary mark is greater than a predetermined distance away from the combined representation for the model printed mark, an adjustment of the printing device that generated the printed mark may be made (block 104). Such adjustments include reducing the print speed of the printing device, increasing the deposition rate of the nozzles of the printing device, increasing the number of passes of the nozzles over the print media, and changing the set of nozzles that form the printed mark.

In some examples, the method (100) may be iteratively performed. That is, the printing device may be operated at an upper bound speed and a printed mark converted (block 101), a number of values calculated (block 102), a combined representation compared (block 103) against a model printed mark. The printing device can then be adjusted (block 104), i.e., speed reduced, and the method (100) repeated until the combined representation is within a certain distance of, equal to, or greater than the combined representation of the model printed mark.

As noted in the above description, the method (100) can be performed without using a test pattern, but rather uses on a sample printed mark from a distinct printing device. That is, side-by-side comparisons to a test pattern and ground truthing may be avoided, and replaced with analysis of the values of the printed mark against values for a model printed mark. While the above described method (100) may rely on a comparison of a model printed mark, such a model printed mark is not a test pattern and it allows for comparison without knowing beforehand anything about the mark. Accordingly, the method (100) as described herein allows for assessment of print quality without the use of a test pattern, but rather refers to a comparison of a sample model printed mark. Moreover, the method (100) can be performed in real time as the printing device is depositing print fluid on a media to form a printed mark.

Figure 2:
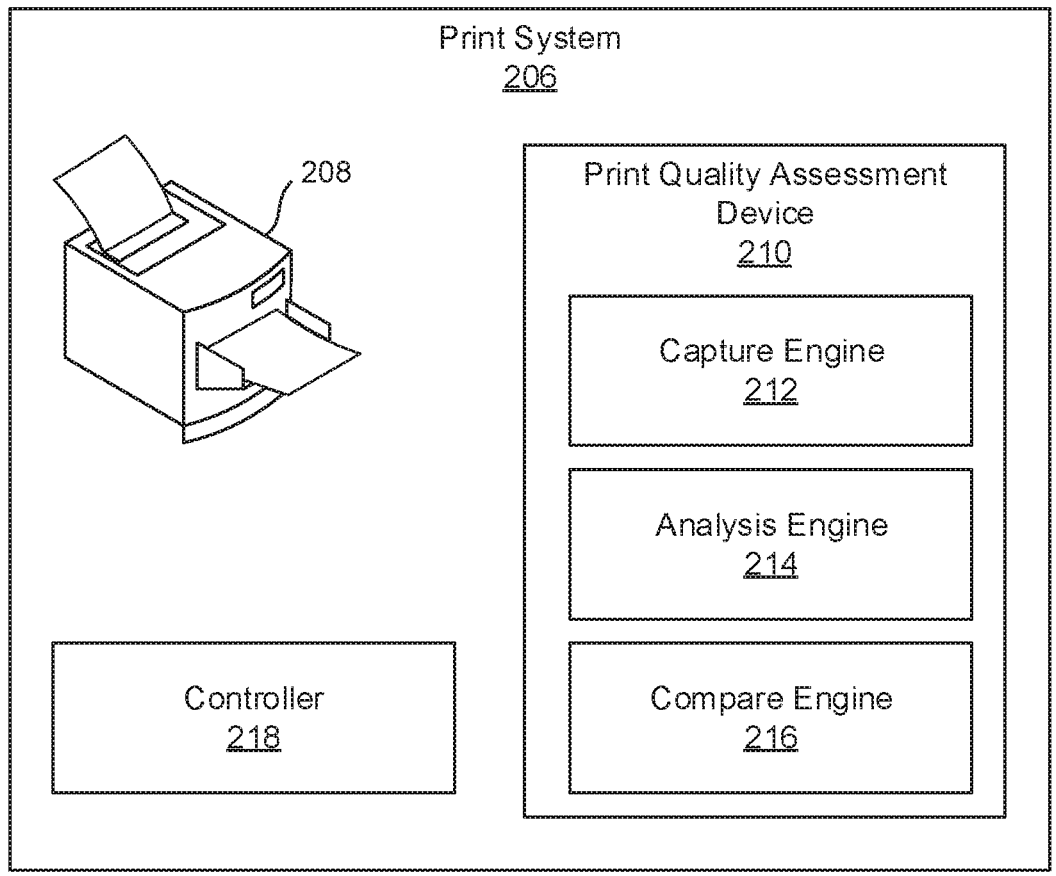
FIG. 2 is a block diagram of a printing system for printing and assessing print quality using an intensity histogram and perimeter length, according to an example of the principles described herein.

FIG. 2 is a block diagram of a print system (206) for printing and for assessing print quality using an intensity histogram and perimeter length, according to an example of the principles described herein. The print system (206) includes a printing device (208) that forms printed marks such as text and/or images on a sheet of media. Specifically, the printing device (208) includes a reservoir of printing fluid or toner. A printhead of the printing device (208) operates to deposit the fluid or toner on the print media in patterns to form the text and/or images.

The print system (206) also includes a print quality assessment device (210) to determine the print quality of marks formed by the printing device (208). To achieve its desired functionality, the print quality assessment device (210) includes various hardware components. Specifically, the print quality assessment device (210) includes a number of engines. The engines refer to a combination of hardware and program instructions to perform a designated function. The engines may be hardware. For example, the engines may be implemented in the form of electronic circuitry (e.g., hardware). Each of the engines may include its own processor, but one processor may be used by all the modules. For example, each of the engines may include a processor and memory. Alternatively, one processor may execute the designated function of each of the modules. Further, the engines may be distributed across hardware and machine-readable storage mediums of a variety of devices.

A capture engine (212) of the print quality assessment device (210) captures a digital representation of the mark. For example, the capture engine (212) may include a scanner that scans the printed mark after it has been formed on the media. Such a scanner may be an inline scanner that is positioned after a fluid ejection device of the printing device (208). With the digital representation created, the capture engine (212) also converts the digital representation into a digital binary mark, which is a binary representation of the digital mark, A binary representation is a representation of the mark wherein each pixel that makes up the digital mark is converted to one of two different values, for example a black pixel value or a white pixel value. This can be done by determining to which value, i.e., black or white, each of the pixels is closest to and converting that pixel to either black or white.

The analysis engine (214) of the print quality assessment device (210) calculates the number of values for the digital binary mark. Specifically, the analysis engine can determine the complexity, i.e., change in direction of the pixels around the perimeter of the printed mark to determine a perimeter roughness and a perimeter length for the printed mark. The analysis engine (214) can also create an intensity histogram by determining how many pixels of each intensity level are found within the mark. From this information, the analysis engine (214) can determine certain properties of the intensity histogram such as a mean value, a variance of the histogram, and a mean-to-variance ratio for the histogram.

A compare engine (216) of the print quality assessment device (210) compares a combined representation of the number of values against a combined representation of a model printed mark. As noted above, the combined representation may be a linear or a weighted combined representation, and the model printed mark may be a printed mark that has a desired or target print quality. That is, at a previous point in time, the analysis engine (214) may have determined a combined representation for a printed mark that has an identified, and/or acceptable print quality. This combined score for the model printed mark can be stored in memory, and referenced by the compare engine (216). If the compare engine (216) determines that the combined representation of the present mark is within a predefined range of the model combined representation, then the compare engine (216) can determine whether the print quality of the present printed mark is acceptable as defined by the model printed mark. Accordingly, in this fashion, the print quality assessment device (210) determines the acceptability of the print quality of a presently printed mark by comparing it to a printed mark with an acceptable print quality.

As noted above, there may be any number of model printed marks corresponding to different print quality settings, and the compare engine (216) may rely on a selected one of the number of model printed marks when determining the acceptability of the quality of the present printed mark. In some examples, the predetermined threshold may be specific to the printing device (208) in the printing system (206). That is, the compare engine (216) may consider such factors as environmental conditions, component capability, in determining whether or not the present printed mark is within an acceptable range of the model printed mark.

The print system (206) also includes a controller (218) to adjust an operation of at least one component of the printing device (208) when the combined representation is greater than a predetermined distance away from a combined representation for the model printed mark. For example, the controller (218) may reduce the speed of the printing device (208). Reducing the print speed of the printing device (208) results in individual nozzles spending more time in the vicinity of the sheet of media, thus ensuring more accurate drop of the print fluid as well as increased coverage. While FIG. 2 depicts the print quality assessment device (210) and the controller (218) being separate from the printing device (208), in some examples these components may be disposed within the printing device (208).

FIG. 3 is a flowchart of a method (300) for assessing print quality using an intensity histogram and perimeter length, according to another example of the principles described herein. According to the method (300), a printed mark is converted (block 301) into a digital binary mark. This may be performed as described above in connection with FIG. 1.

According to this example of the method (300), a centroid of the digital binary mark is determined (block 302). The centroid of a digital binary mark refers to an (x,y) location for which 50% of the pixels in a region are to the right, 50% to the left, 50% above, and 50% below. That is, the centroid of the digital binary mark refers to the density center of the printed mark where equal amounts of pixels are found above, below, and to the sides of the mark. The digital binary mark is then divided (block 303) into radially defined segments based on 0 degrees being the ray starting at the centroid and pointing due right and 90 degrees being the ray starting at the centroid and pointing due above. For example, there may be 360 radially defined segments for a given printed mark if increments of 1-degree slices are used for the radial segments. Then, for each radially defined segment, a number of values are calculated (block 304) for the digital binary mark. As described above, a number of values can be used due to their correlation with print quality.

A description of various values will now be provided. First, one of the number of values may be a perimeter roughness value. To determine a perimeter roughness, the complexity, i.e., the number of changes in direction, of the perimeter in the radial direction is computed. A median value is then determined from all segments to determine a printed mark perimeter roughness value.

As another example, a perimeter length may be calculated. To determine a perimeter length value for the printed mark, a perimeter, in pixels, is measured for each segment, and the perimeter of each segment is combined to determine a perimeter length. The perimeter roughness and perimeter length correlate to print quality. For example, since rough text will tend to have ectopic satellites, invaginations, and porosities at or near the perimeter, perimeter roughness, and perimeter length will be greater for lower quality printed marks.

Still further, an intensity histogram, which reflects the quantity of each level of color intensity in a printed mark can be graphed and values of that intensity histogram determined. Specifically, an intensity histogram mean value and an intensity histogram variance value are calculated, along with an intensity histogram mean-to-variance ratio value. Because lower quality printed marks have less ink, lower quality printed marks will have an increased intensity, meaning a lighter printed mark. As the mean increases, lower quality printed marks will also decrease since the printed marks have less contrast against the background.

Tables (1) and (2) below provide numeric examples of a model printed mark and a printed mark to be evaluated.

TABLE 1

| Metric | Model "G" | Evaluated "G" | Difference |
| --- | --- | --- | --- |
| Perimeter Roughness | 7.90 | 9.65 | 22.2% |
| Perimeter Length in Pixels | 8832 | 8900 | 68 pixels |
| Intensity Histogram Mean | 57.6 | 77.1 | 33.9% |
| Intensity Histogram Variance | 295.7 | 270.2 | −8.6% |
| Mean/Variance Ratio | 0.194 | 0.278 | 43.3% |

TABLE 2

| Metric | Model "S" | Evaluated "S" | Difference |
| --- | --- | --- | --- |
| Perimeter Roughness | 19.31 | 20.63 | 6.8% |
| Perimeter Length in Pixels | 5518 | 5610 | 92 pixels |
| Intensity Histogram Mean | 94.0 | 115.5 | 22.9% |
| Intensity Histogram Variance | 338.1 | 269.8 | −20.2% |
| Mean/Variance Ratio | 0.286 | 0.428 | 49.7% |

As indicated in the above tables, the mean/variance ratio, intensity histogram mean, and perimeter length provide higher overall correlation to print quality as compared to the perimeter roughness and the intensity histogram variance. Accordingly, the combined representation may be weighted combination that favors these metrics.

As described above, a combined representation of these values can be compared (block 305) against a combined representation for a model printed mark. As an additional numerical example, distinct from the example information presented in Tables 1 and 2, suppose the number or values are calculated for a printed mark generated by the printing device (FIG. 2, 208) at various speeds. Table (3) below presents the combined representation for printed marks generated by the printing device (FIG. 2, 208) at various speeds. Table (3) also presents the difference between the combined representation for the printed mark and the combined representation for a model printed mark and a standard deviation for each difference.

TABLE 3

| Speed | Distance | Standard Deviation |
| --- | --- | --- |
| 800 feet per minute | 54.00 | +/− 7.65 |
| 700 feet per minute | 38.10 | +/− 6.54 |
| 600 feet per minute | 21.37 | +/− 8.12 |
| 500 feet per minute | 4.78 | +/− 4.67 |

From Table (3), it may be determined that an acceptable print quality, or a print quality that is close to the model printed mark, can be obtained at approximately 500 feet per minute since the value 4.78+/−4.67 is statistically non-significantly different from 0.0. In another example, the predetermined threshold may allow for the printing device to be operated at 600 feet per minute if it is determined that 21.37+/−8.12 is close enough, i.e., within an acceptable range, to the model printed mark. Note that the distance indicated in Table (3) is a unitless measure determined by combining the various values calculated for the printed mark.

Figure 4:
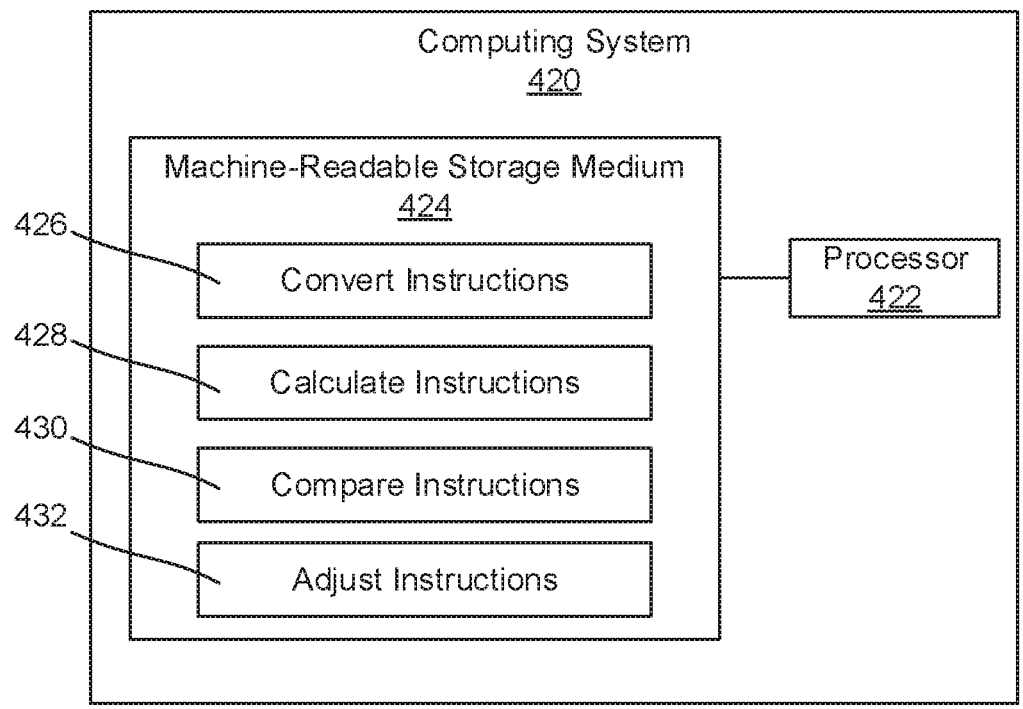
FIG. 4 is a diagram of a computing system to assess print quality using an intensity histogram and perimeter length, according to an example of the principles described herein.

Based on the results of the comparison, the printing device (FIG. 2, 208) may be adjusted (block 306) when the combined representation is greater than a predetermined distance away from the combined representation for the model printed mark. This may be performed as described above in connection with FIG. 1. Note that in some examples while the printed mark is being converted (block 301), values calculated (block 304), and combined representations compared (block 305), the printing device (FIG. 2, 208) may be printing the printed mark. That is the assessment of print quality may be executed while a print job is being processed, Doing so allows for quick determination of print quality without interrupting the production of a print job, FIG. 4 is a diagram of a computing system (420) to assess print quality using an intensity histogram and perimeter length, according to an example of the principles described herein. To achieve its desired functionality, the computing system (420) includes various hardware components.

Specifically, the computing system (420) includes a processor (422) and a machine-readable storage medium (424). The machine-readable storage medium (424) is communicatively coupled to the processor (422). The machine-readable storage medium (424) includes a number of instruction sets (426, 428, 430, 432) for performing a designated function. The machine-readable storage medium (424) causes the processor (422) to execute the designated function of the instruction sets (426, 428, 430, 432).

Although the following descriptions refer to a single processor (422) and a single machine-readable storage medium (424), the descriptions may also apply to a computing system (420) with multiple processors and multiple machine-readable storage mediums. In such examples, the instruction sets (426, 428, 430, 432) may be distributed (e.g., stored) across multiple machine-readable storage mediums and the instructions may be distributed (e.g., executed by) across multiple processors.

The processor (422) may include at least one processor and other resources used to process programmed instructions. For example, the processor (422) may be a number of central processing units (CPUs), microprocessors, and/or other hardware devices suitable for retrieval and execution of instructions stored in machine-readable storage medium (424). In the computing system (420) depicted in FIG. 4, the processor (422) may fetch, decode, and execute instructions (426, 428, 430, 432) for controlling a print quality assessment device (FIG. 2, 210). In one example, the processor (422) may include a number of electronic circuits comprising a number of electronic components for performing the functionality of a number of the instructions in the machine-readable storage medium (424). With respect to the executable instruction, representations (e.g., boxes) described and shown herein, it should be understood that part or all of the executable instructions and/or electronic circuits included within one box may, in alternate examples, be included in a different box shown in the figures or in a different box not shown.

The machine-readable storage medium (424) represent generally any memory capable of storing data such as programmed instructions or data structures used by the computing system (420). The machine-readable storage medium (424) includes a machine-readable storage medium that contains machine-readable program code to cause tasks to be executed by the processor (422). The machine-readable storage medium (424) may be tangible and/or non-transitory storage medium. The machine-readable storage medium (424) may be any appropriate storage medium that is not a transmission storage medium. For example, the machine-readable storage medium (424) may be any electronic, magnetic, optical, or other physical storage device that stores executable instructions. Thus, machine-readable storage medium (424) may be, for example, Random Access Memory (RAM), a storage drive, an optical disc, and the like. The machine-readable storage medium (424) may be disposed within the computing system (420), as shown in FIG. 4. In this situation, the executable instructions may be "installed" on the computing system (420). In one example, the machine-readable storage medium (424) may be a portable, external or remote storage medium, for example, that allows the computing system (420) to download the instructions from the portable/external/remote storage medium. In this situation, the executable instructions may be part of an "installation package". As described herein, the machine-readable storage medium (424) may be encoded with executable instructions for controlling a print quality assessment device (FIG. 2, 210).

Referring to FIG. 4, convert instructions (426), when executed by a processor (422), may cause the computing system (420) to convert a printed mark into a digital binary mark. Calculate instructions (428), when executed by a processor (422), may cause the computing system (420) to calculate a number or values for the digital binary mark, wherein the number of values include a perimeter roughness value, a perimeter length value, an intensity histogram mean value, an intensity histogram variance value, and an intensity histogram mean-to-variance ratio value. Compare instructions (430), when executed by a processor (422), may cause the computing system (420) to compare the combined representation of the number of values against a combined representation for a model printed mark. Adjust instructions (432), when executed by a processor (422), may cause the computing system (420) to adjust operation of a printing device (FIG. 2, 208) that generated the printed mark when the combined representation is greater than a predetermined distance away from the combined representation for the model printed mark. In some examples, the instruction set includes instructions to, when executed by a processor (422), cause the computing system (420) to select, from a set of model printed marks, the model printed mark that reflects a target print quality.

In some examples, the processor (422) and machine-readable storage medium (424) are located within the same physical component, such as a server, or a network component. The machine-readable storage medium (424) may be part of the physical component's main memory, caches, registers, non-volatile memory, or elsewhere in the physical component's memory hierarchy. In one example, the machine-readable storage medium (424) may be in communication with the processor (422) over a network. Thus, the computing system (420) may be implemented on a user device, on a server, on a collection of servers, or combinations thereof.

The computing system (420) of FIG. 4 may be part of a general-purpose computer. However, in some examples, the computing system (420) is part of an application specific integrated circuit.

In one example, using such a print quality assessment tool 1) provides for print quality assessment without previous mark identification 2) provides for print quality assessment without comparison to a test pattern, or ground truthing, but rather relies on a sample print from a distinct printing device, 3) simplifies print quality detection, 4) balances print speed with print quality, 5) optimizes print fluid usage by increasing speed without compromising user expectations on print quality, and 6) can be implemented on any printer at any speed. However, it is contemplated that the devices disclosed herein may address other matters and deficiencies in a number of technical areas.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (422) of the computing system (420) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for assessing print quality comprising:
converting a printed mark into a digital binary mark;
calculating a number of values for the digital binary mark including at least a perimeter length value and a value describing a characteristic of an intensity histogram for the digital binary mark;
comparing a combined representation of the number of values for the digital binary mark against a combined representation of a number of values for a model printed mark; and
adjusting operation of a printing device that generated the printed image when the combined representation for the digital binary mark is greater than a predetermined distance away from the combined representation for the model printed mark.

2. The method of claim 1, wherein the number of values further comprise:
a perimeter roughness value;
an intensity histogram mean value;
an intensity histogram variance value; and
an intensity histogram-to-variance ratio value.

3. The method of claim 1, wherein the model printed mark has a target print quality.

4. The method of claim 1; wherein the combined representation of the number of values for the digital binary mark is a linear combination of the number of values.

5. The method of claim 1, wherein the combined representation of the number of values for the digital binary mark is a weighted combination of the number of value based on their relative correlation to print quality.

6. The method of claim 1, further comprising:
determining a centroid of the digital binary mark; and
dividing the digital binary mark into radially-defined segments;
wherein calculating a number of values for the digital binary mark is performed on a per-segment basis.

7. The method of claim 1, further comprising processing a print job to which the printed mark corresponds while converting the printed mark, calculating the number of values, and comparing a combined representation of the number of values.

8. The method of claim 1, wherein print quality is assessed against a sample mark without a test pattern.

9. A print system comprising:
a printing device to form a printed mark on media by depositing fluid on the media;
a print quality assessment device, comprising:
a capture engine to:
capture a digital representation of the printed mark; and
convert the digital representation into a digital binary mark;
an analysis engine to calculate a number of values for the digital binary mark;
a compare engine to compare a combined representation of the number of values for the digital binary mark against a combined representation of a number of values for a model printed mark; and
a controller to adjust an operation of at least one component of the printing device when the combined representation for the digital binary mark is greater than a threshold distance away from the combined representation for the model printed mark.

10. The system of claim 9, wherein the controller reduces the speed of the printing device.

11. The system of claim 9, wherein the capture device is a scanner.

12. The system of claim 9, wherein the model printed mark is specific to the printing device in the print system.

13. A computer system comprising:
a processor;
a machine-readable storage medium coupled to the processor; and
an instruction set to assess print quality, the instruction set being stored in the machine-readable storage medium to be executed by the processor, wherein the instruction set comprises:
instructions to convert a printed mark into a digital binary mark;
instructions to calculate a number of values for the digital binary mark, wherein the number of values comprise:
a perimeter roughness value;
a perimeter length value;
an intensity histogram mean value;
an intensity histogram variance value; and
an intensity histogram mean-to-variance ratio value;
instructions to compare the combined representation of the number of values for the digital binary mark against a combined representation for a number of values of a model printed mark; and
instructions to adjust operation of a printing device that generated the printed mark when the combined representation for the digital binary mark is greater than a threshold distance away from the combined representation for the model printed mark.

14. The system of claim 13, wherein the instructions to assess print quality are executed without reference to a test pattern.

15. The system of claim 13, wherein the instruction set to assess print quality further comprises instructions to select, from a set of model printed marks, the model printed mark as it reflects a desired target print quality.

* * * * *